Sept. 9, 1941.  R. J. WILKIE  2,255,577
BAND SAW PACKAGE
Filed June 26, 1939  3 Sheets-Sheet 1

Inventor
Robert J. Wilkie
By Ira Milton Jones
Attorney

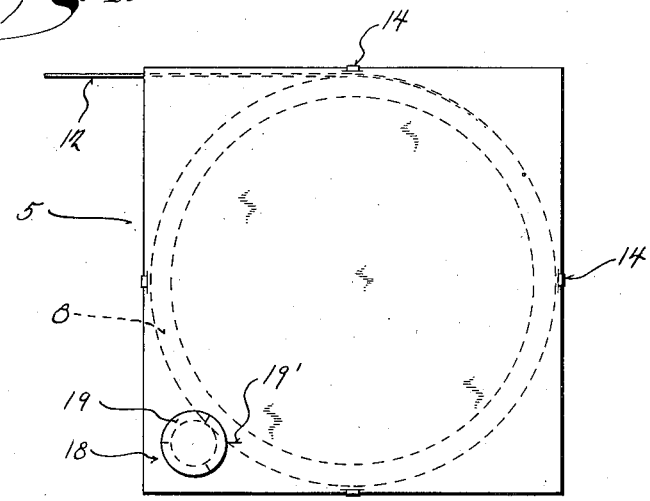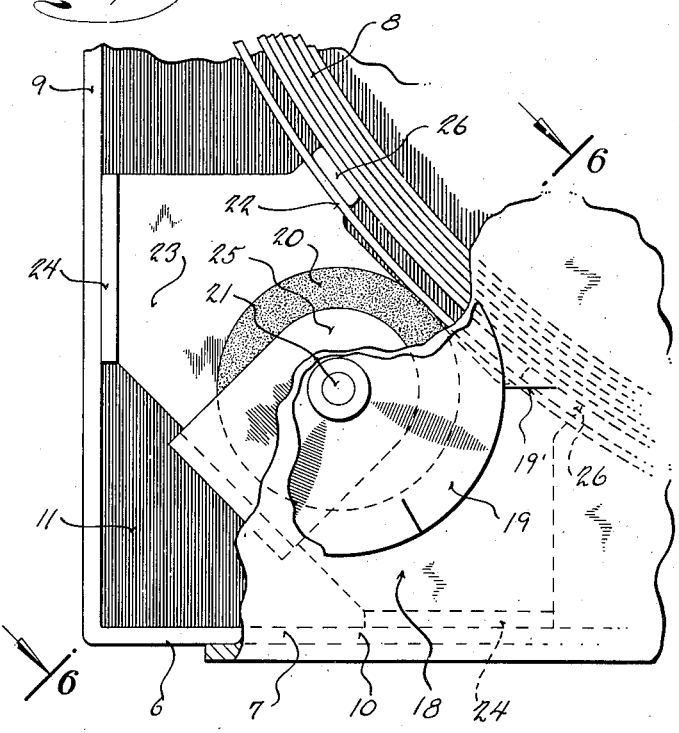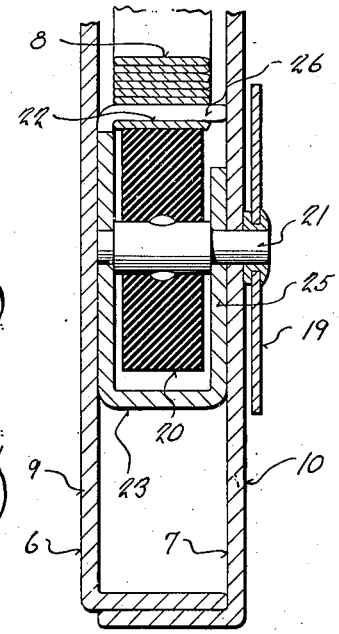

Sept. 9, 1941.  R. J. WILKIE  2,255,577
BAND SAW PACKAGE
Filed June 26, 1939  3 Sheets-Sheet 3

Inventor:
Robert J. Wilkie

Patented Sept. 9, 1941

2,255,577

UNITED STATES PATENT OFFICE 2,255,577

BAND SAW PACKAGE

Robert J. Wilkie, Minneapolis, Minn., assignor to Continental Machines, Incorporated, Minneapolis, Minn., a corporation of Minnesota Application June 26, 1939, Serial No. 281,211

2 Claims. (Cl. 206—52)

This invention relates to improvements in band saw packages and has, as one of its objects, the provision of a compact and convenient package for shipping and handling saw bands for use on power saws.

Saw bands are now generally supplied to the customer in a coil, from which any desired length may be cut. This is done to enable the user of a band saw, particularly of the metal sawing type, to replace sections of the saw band which may have become damaged, and to facilitate complete replacement of the entire saw band.

Such replacement of the entire band or a section thereof is a simple matter because these metal sawing machines are equipped with a welding device by which the ends of the saw band are quickly welded together.

Heretofore, no special package was provided for shipping and handling the saw bands. Consequently, the handling of the band, especially during removal of a portion thereof, was attended with considerable difficulty. The tension under which the bands are placed upon being coiled in a diameter sufficiently small for convenient handling would cause them to spring open in the fashion of a clock spring as soon as the securing means holding the band was released.

The present invention overcomes this objectionable condition through the provision of a novel package so designed as to safely enclose a coiled length of saw band in a manner permitting any desired length thereof to be pulled out and cut off.

Another object of this invention is to provide a package of the character described which is so designed that the normal resiliency of the band, acting through the tension under which the band is placed upon being coiled up, serves to frictionally hold the coil against displacement in the box.

Still another object of this invention is to provide means for conveniently indicating the length of the band pulled out of the box.

With the above and other objects in view, which will appear as the description proceeds, this invention resides in the novel construction, combination and arrangement of parts substantially as hereinafter described, and more particularly defined by the appended claims, it being understood that such changes in the precise embodiment of the hereindisclosed invention may be made as come within the scope of the claims.

The accompanying drawings illustrate several examples of the physical embodiment of the invention constructed in accordance with the best modes so far devised for the practical application of the principles thereof, and in which:

Figure 4 is a front elevation of the box to show another manner of metering the length of the band as it is pulled out of the box;

Figure 5 is an enlarged top view of the metering device shown in Figure 4;

Figure 6 is a cross sectional view taken through Figure 5 on the plane of the line 6—6;

Figure 1:
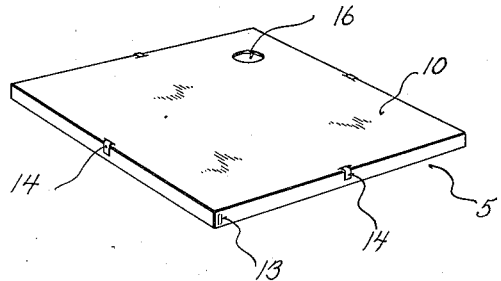
Figure 1 is a perspective view of a band saw package embodying this invention.

Referring now particularly to the accompanying drawings, in which like numerals indicate like parts throughout the several views, the numeral 5 designates a box which consists of a bottom 6 and a cover 7, and which contains a coiled length of saw band 8. The box is substantially square so that the outermost coil will engage the inner surfaces of all four side walls 9 of the bottom 6 for a purpose to be hereinafter described.

The top and bottom walls 10 and 11, respectively, are spaced apart a distance just sufficient to receive the width of the band therebetween, and the size of the box is such as to maintain the coil under substantial tension.

The end portion 12 of the outermost coil extends tangentially from the coil per se along one side wall 9 to project through an opening 13 in the adjacent side wall of the bottom and also the cover.

Figure 2:
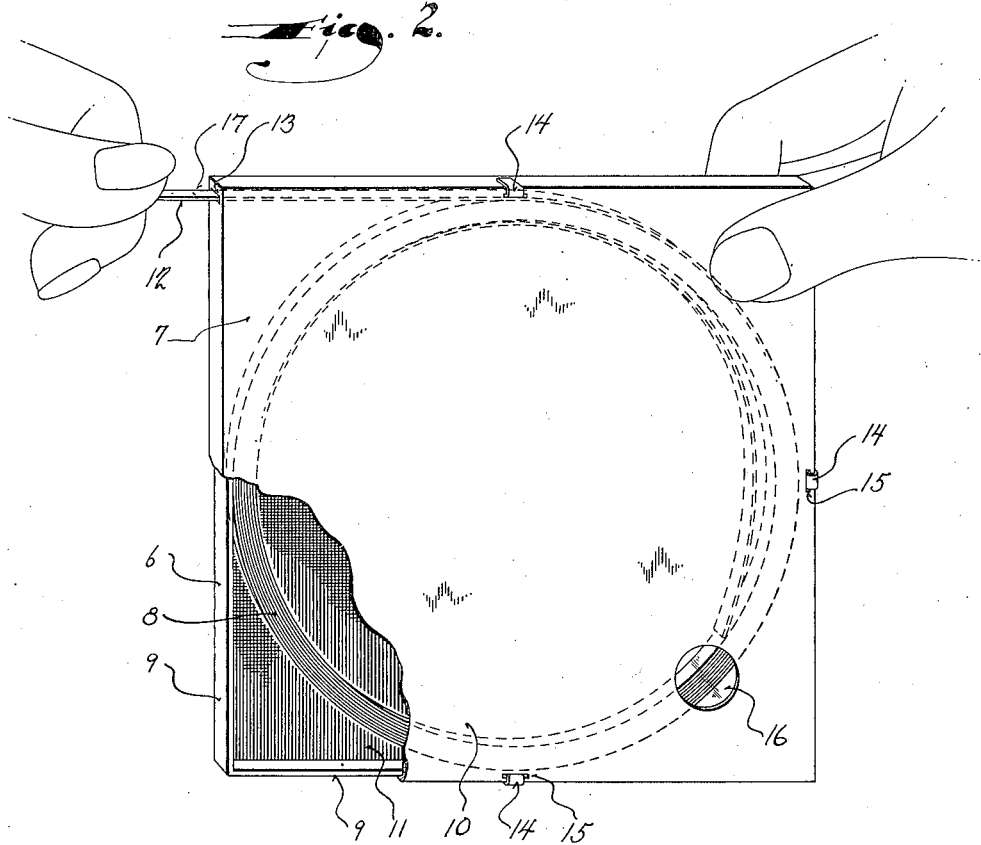
Figure 2 is a perspective view with parts broken away illustrating the manner in which the saw band is pulled out of the box.
Figure 3:
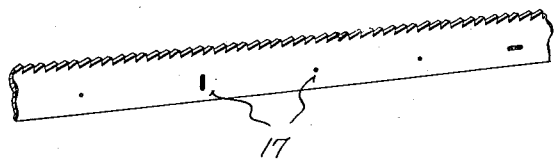
Figure 3 is a view showing a short length of the saw band and illustrating one manner of designating the length of the band pulled from the box.

Hence, as shown in Figure 2, it is possible to pull out any desired length of saw band without in anywise disturbing the coil.

To guard against the possibility of having the cover become disengaged from the bottom of the box, clips 14, carried by the side walls 9 of the bottom, pass through openings 15 in the cover and engage over the side walls, as shown.

As has been stated, the saw band is coiled to a diameter which places the same under substantial tension. As a consequence, the coil maintains itself in frictional engagement with the inner side walls of the box to resist displacement thereof and to hold the same in proper position.

If desired, a window 16, covered with Cellophane or any other suitable transparent material, may be formed in the cover to permit visual determination of the number of coils still left in the box without necessitating opening the same.

It is also desirable to provide means for quickly indicating or metering the length of the band as it is pulled from the box; and to this end, the saw band itself may be provided with designations 17 arranged to represent feet and inches. These designations obviously make it possible for the operator to pull out and cut off any specific length of band.

Another manner of metering the length of the band pulled out of the box is illustrated in Figures 4, 5 and 6. In this instance, the cover carries a metering device, indicated generally by the numeral 18.

This metering device consists of a dial or other rotatable indicator 19 overlying the outer face of the cover to cooperate with a pointer 19' in the form of a mark formed on the cover, and means inside of the box for translating the motion of the coil incidental to removal of a section thereof into rotation of this dial or indicator.

The motion translating mechanism consists of a friction wheel 20 of rubber or other suitable material fixed to the shaft 21 of the dial and arranged to press against the outer surface of the outermost coil 22.

The shaft 21 is journalled in a carrier frame 23 preferably formed of sheet metal and provided with arms 24 which engage the adjacent side walls 9 of the bottom of the box. The main portion of the carrier frame lies flat against the bottom of the box and an overhanging arm 25 in which the outer end of the shaft is journalled, is positioned to contact the inner face of the cover.

Guide fingers 26 struck up from the main portion of the frame hook over the outermost coil 22, as shown in Figure 5, to hold the same firmly against the periphery of the friction wheel 20.

Hence, as the coil turns upon having its end portion pulled out through the opening, rotation is imparted to the indicator dial which is delineated so as to properly indicate or meter the length of the band pulled out of the box.

Figure 7:
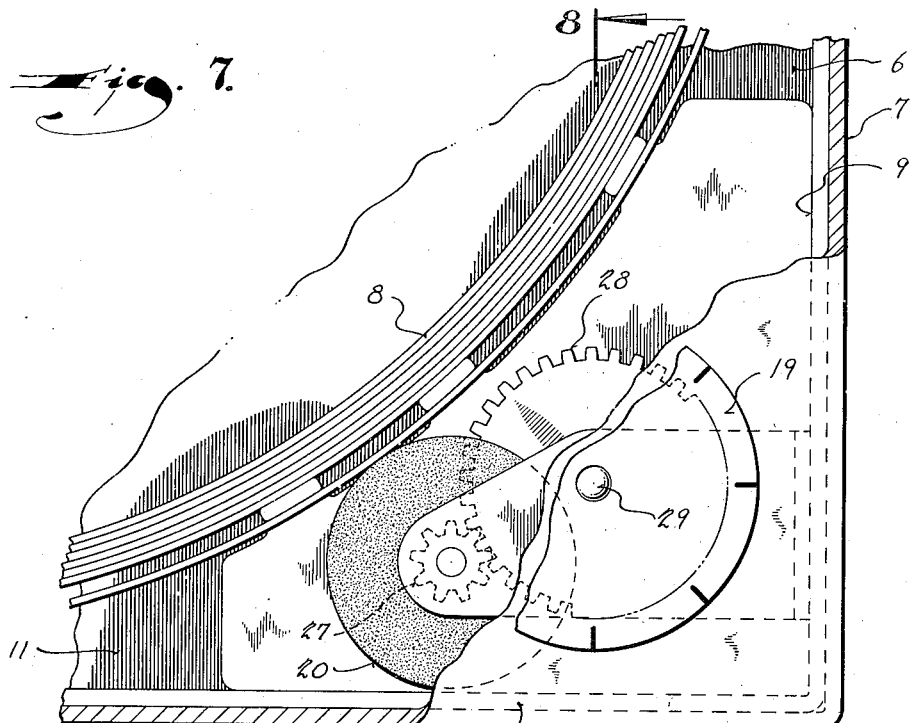
Figure 7 is a view similar to Figure 5 showing another embodiment of the metering device.
Figure 8:
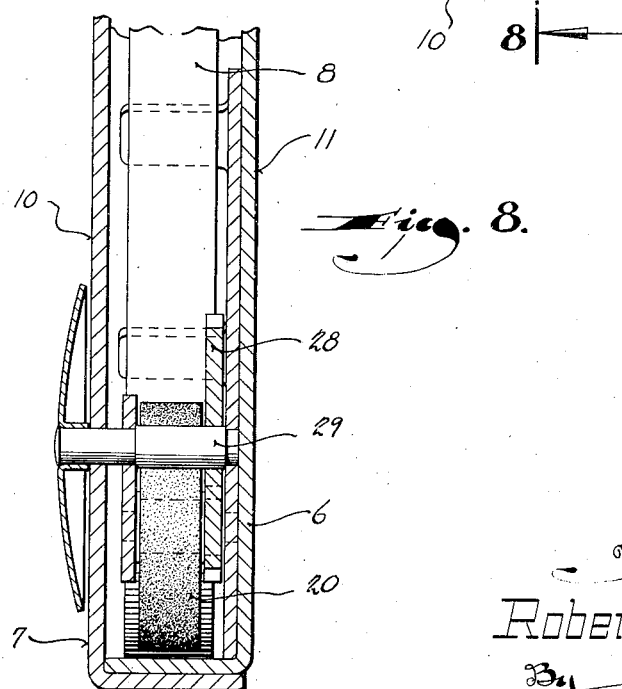
Figure 8 is a detail sectional view taken through Figure 7 on the plane of the line 8—8.

The metering device, illustrated in Figures 7 and 8, is very much like that shown in Figures 4, 5 and 6. In this construction, the indicator dial is drivingly connected with the friction wheel through a pinion 27 on the shaft of the friction wheel and a gear 28 fixed to the shaft 29 of the dial.

Except for the specific shape of the carrier frame and the number of guide fingers which engage over the outer coil of the saw band, the construction of this embodiment of the invention is like that shown in Figures 4, 5 and 6.

From the foregoing description taken in connection with the accompanying drawings, it will be readily apparent that this invention provides an exceptionally compact and convenient manner of shipping and handling saw bands and similar articles.

What I claim as my invention is:

1. A package for shipping and handling flexible highly springy metal saw bands comprising, the combination of: complementary shallow inner and outer box sections telescoped flatwise one within the other, each section including a flat one-piece bottom wall and connecting side walls, the side walls of the outer box section overlapping those of the inner box section, the intermediate portions of at least three of the side walls of the box being flat and substantially equi-spaced from the center of the box; a freely expansible coiled length of saw band in the box with the outer surface of its outer coil frictionally and tangentially engaging the flat portions of said side walls of the inner box section and exerting a substantial outward force thereon, the free end portion of the outer coil extending tangentially therefrom and being projectible through aligned openings in the overlapped side walls of the box remote from the points of engagement of the band with said side walls of the inner box section and in direct line with the tangentially extending free end portion of the band to allow a length of the band to be pulled straight out without necessitating kinks or bends in the band; and common means contiguous to the points of contact between the coil and said side walls of the box for holding the box sections against separation and for reinforcing said side walls at the points at which force is applied thereto by the coil to preclude deformation of said side walls and bursting of the box as a result of the expansive force of the coil.

2. A package for shipping and handling flexible highly springy metal saw bands comprising, the combination of: complementary shallow inner and outer box sections telescoped flatwise one within the other, each section including a flat one-piece bottom wall and connecting side walls, the side walls of the outer box section overlapping those of the inner box section, the intermediate portions of at least three of the side walls of the box being flat and substantially equi-spaced from the center of the box; a freely expansible coiled length of saw band in the box with the outer surface of its outer coil frictionally and tangentially engaging the flat portions of said side walls of the inner box section and exerting a substantial outward force thereon, the free end portion of the outer coil extending tangentially therefrom and being projectible through aligned openings in the overlapped side walls of the box remote from the points of engagement of the band with said side walls of the inner box section and in direct line with the tangentially extending free end portion of the band to allow a length of the band to be pulled straight out without necessitating kinks or bends in the band; and common means carried by one of said box sections contiguous to the points at which force is applied to said side walls by the coil and engaging a portion of the other box section for holding the sections securely against separation and for reinforcing said side walls against deformation by the expansive force of the coil and thereby transferring the expansive force of the coil into tensioning forces on the bottom wall of at least one of said box sections to thus preclude bursting of the box.

ROBERT J. WILKIE.